Patented July 18, 1933

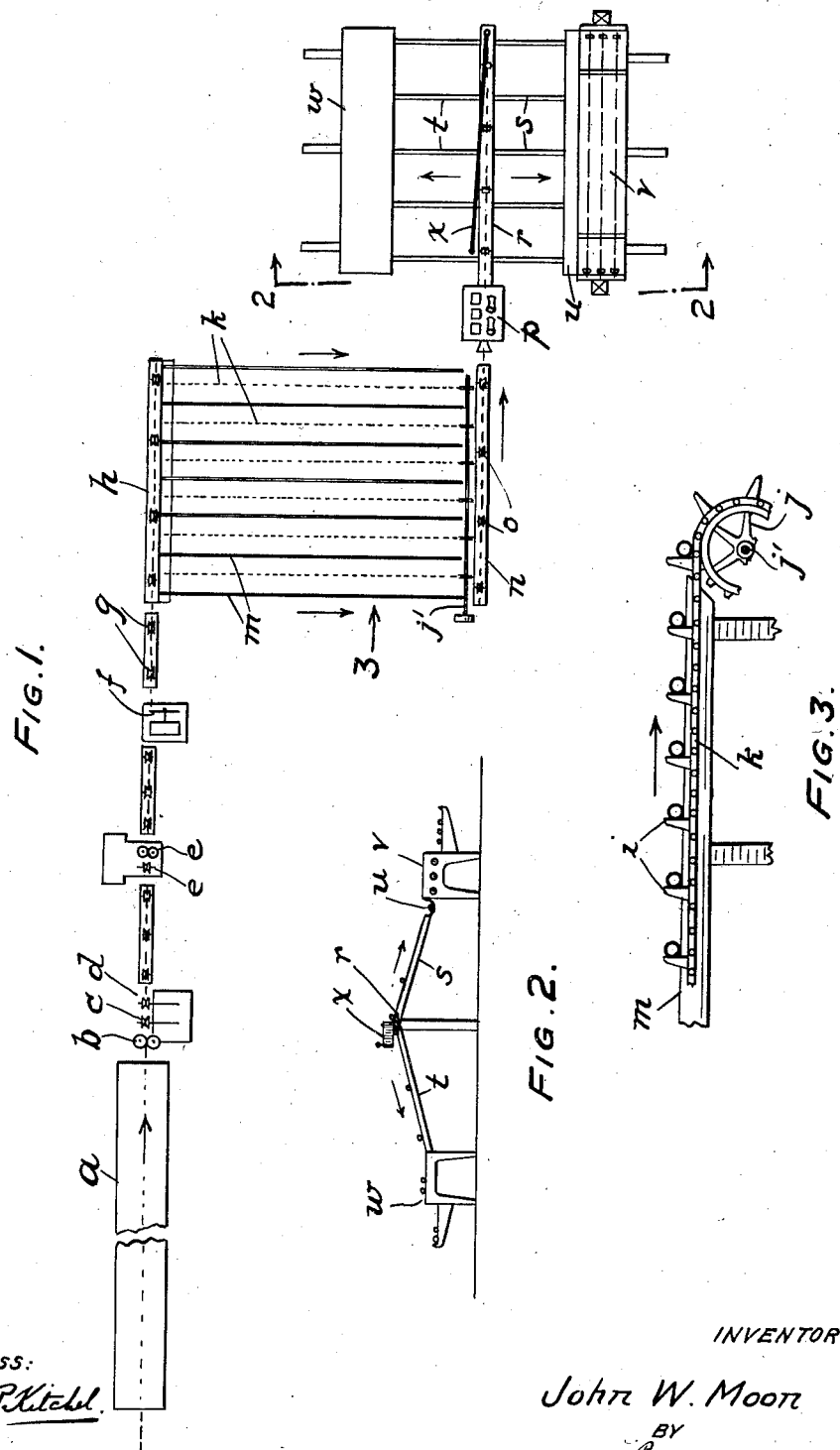

1,918,772

UNITED STATES PATENT OFFICE

JOHN W. MOON, OF BUTLER, PENNSYLVANIA, ASSIGNOR, BY DIRECT AND MESNE ASSIGNMENTS, TO FRETZ-MOON TUBE COMPANY, INC., OF BUTLER, PENNSYLVANIA, A CORPORATION OF PENNSYLVANIA

APPARATUS FOR MANUFACTURING TUBING

Application filed July 11, 1927. Serial No. 204,712.

In patents issued to me December 4, 1923, No. 1,476,537 and No. 1,476,632, I have set forth a process and apparatus for producing continuous tubing from an endless length of flat skelp which continuously travels through an elongated furnace in which every point in its length is gradually heated up to or near a welding heat, the skelp being formed into a tube and its edges welded together by bending and welding rolls located just in front of the delivery mouth of the furnace; these bending and welding rolls and sizing rolls arranged beyond the bending and rolling rolls operating to pull the skelp through the furnace. Beyond the sizing rolls the tubing is cut to length by a suitable saw, such as, for example, is disclosed in my application filed March 23, 1925, Serial No. 17,673.

The object of the present invention is to provide a process and means whereby the severed pipe sections may be cooled, straightened and delivered to a machine for threading the ends.

In the drawing, which shows a preferred embodiment of the invention—

Fig. 1 is a diagrammatic plan view of a substantially complete mill.

Fig. 2 is a section on the line 2—2 of Fig. 1.

Fig. 3 is a detail view of part of one of the conveyor chains looking in the direction of the arrow 3 of Fig. 1.

The skelp is continuously pulled through the furnace $a$ wherein it is heated to the desired temperature. It thence passes through the bending rolls $b$, the welding rolls $c$, the shaping or preliminary finishing rolls $d$ and the sizing or final finishing rolls $e$ $e$. Other arrangements of rolls are practicable and permissible. The tubing is cut to length by means of the saw $f$. Rollers $g$ convey the cut lengths of tubing (hereinafter called tubes) onto a table $h$ arranged at the end of a conveyor, which transports the tubes laterally in a direction at right angles to their direction of extension and to the direction in which the skelp travels through the furnace and rolls.

The conveyor comprises a series of parallel sprocket chains $k$, which are driven from sprocket wheels $j$ on a driving shaft $j'$ and are provided with fingers $i$, which engage the tubes and carry them in the direction indicated by the down-pointing arrows in Fig. 1.

The upper reach of the conveyor, which is that reach that transports the tubes, travels over a rack comprising upstanding ribs $m$ arranged between and parallel to the chains $k$ and extending above the level of the chains $k$ but below the level of the tops of the conveyor fingers $i$. Thereby, the tubes, as they are carried over the rack, rest on the ribs $m$ and roll over and over thereon.

It is clear that by means of the described rack and conveyor adequate provision is afforded for the circulation of air over the tubes and in contact with all parts of their surfaces. The rack is of such length that the tubes are cooled to the desired degree when they reach the trough $n$ on which they are deposited, one by one, by the conveyor.

Arranged along the bottom of the trough $n$ are positively driven rollers $o$, which convey the tubes, one at a time, through a straightener $p$ and thence onto a ridge piece $r$ between two inclined tables or skids $s$ and $t$, down one or the other of which the cooled and straightened tubes roll.

At the lower or outside edge of skid $s$ is a magazine $u$ and alongside this magazine is an automatic threading machine $v$ of known construction.

At the lower or outside edge of skid $t$ is a table $w$ adapted to receive tubes which it is not desired to thread or which it may be desired to thread by manually operable threading means.

The discharge of tubes onto one or the other skid is dependent on the position of a lever $x$ pivoted at the far end of the ridge $r$, the lever being shiftable in either direction from a central position and acting, when so shifted, as a cam to direct the tubes from the straightener $p$ to one or the other of the skids $s$ and $t$.

Having now fully described my invention, what I claim and desire to protect by Letters Patent is:

1. In a tube handling device, a ridge piece, a skid extending downwardly from the ridge piece, a table at the lower end of the skid arranged to receive tubes from the skid, means for feeding tubes in the direction of their lengths to the ridge piece, and means for moving tubes from the ridge piece to the skid.

2. In a tube handling device, a ridge piece, a skid extending downwardly from the ridge piece, a table at the lower end of the skid arranged to receive tubes from the skid, means for feeding tubes in the direction of their lengths to the ridge piece, and means for moving tubes from the ridge piece to the skid, said last named means consisting of a member arranged to be engaged by the advancing end of a tube to deflect the same sidewise.

3. In a tube handling device, a ridge piece, skids extending downwardly from opposite sides of the ridge piece, a table at the lower ends of the skids arranged to receive tubes from the skids, means for feeding tubes in the direction of their lengths to the ridge piece, and means for selectively moving tables from the ridge piece to one or the other of the skids.

4. In a tube handling device, a ridge piece, skids extending downwardly from opposite sides of the ridge piece, a table at the lower ends of the skids arranged to receive tubes from the skids, means for feeding tubes in the direction of their lengths to the ridge piece, and means for selectively moving tubes from the ridge piece to one or the other of the skids, said last named means consisting of a lever movable so as to be engaged selectively on either side by the advancing end of a tube to deflect the same sidewise.

JOHN W. MOON.